US008936524B2

(12) United States Patent
Howe et al.

(10) Patent No.: US 8,936,524 B2
(45) Date of Patent: Jan. 20, 2015

(54) SHIFT BY WIRE TRANSMISSION SHIFT CONTROL SYSTEM

(75) Inventors: Brian D. Howe, Shelby Township, MI (US); Yang Soo Cho, LaSalle (CA); Jeremy J. Gill, Davisburg, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 269 days.

(21) Appl. No.: 13/472,936

(22) Filed: May 16, 2012

(65) Prior Publication Data

US 2013/0305865 A1 Nov. 21, 2013

(51) Int. Cl.
*F16H 35/02* (2006.01)

(52) U.S. Cl.
USPC .......... 475/14

(58) Field of Classification Search
CPC .......... F16H 61/32; F16H 61/326; F16H 2061/1292; F16H 61/12; F16H 61/22; F16H 2059/0295; F16H 2061/1232; F16H 59/08; F16H 61/28
USPC .......... 475/14, 149; 74/335, 473.12; 701/62
See application file for complete search history.

(56) References Cited

U.S. PATENT DOCUMENTS 6,484,598 B2 * 11/2002 Peter .......... 74/335
6,918,314 B2 * 7/2005 Wang .......... 74/335
7,241,244 B2 * 7/2007 Wang .......... 475/155
7,354,372 B2 * 4/2008 Wang .......... 475/155
8,336,418 B2 * 12/2012 Giefer et al. .......... 74/473.23
8,413,784 B2 * 4/2013 Giefer et al. .......... 192/219.4
8,499,661 B2 * 8/2013 Rake et al. .......... 74/473.25
8,560,193 B2 * 10/2013 Krishnaswami et al. .......... 701/62
2002/0045506 A1 * 4/2002 Scheuerer .......... 475/5
2003/0221499 A1 12/2003 Wong
2009/0326767 A1 12/2009 Kamada et al.
2011/0138532 A1 6/2011 Lin

FOREIGN PATENT DOCUMENTS

JP 2008-180250 8/2008
JP 2010-151302 7/2010

OTHER PUBLICATIONS

Written Opinion & International Search Report for PCT/US13/41179 mailed Aug. 26, 2013, 11 pages.
Photo of what is understood to be a Siemens' Actuator for a Mercedes Vehicle.

* cited by examiner

*Primary Examiner* — Dirk Wright
(74) *Attorney, Agent, or Firm* — Reising Ethington PC; Matt Schmidt; Dean Watson

(57) ABSTRACT

At least one implementation of a gear shift control system includes an output mechanism coupled to a vehicle transmission, a first drive member coupled to the output mechanism to drive the output mechanism to shift between gears of the transmission and a drivetrain. The drivetrain may include a first input driven by the drive member during a first mode of operation of the gear shift control system and an output coupled to both the first input and the output mechanism to drive the output mechanism as commanded by the drive member. During a second mode of operation of the gear shift control system a second input is coupled to the output. A second drive member is coupled to the second input to drive the output mechanism through the second input and the output during the second mode of operation to cause a transmission gear shift.

20 Claims, 7 Drawing Sheets

10
14
20
16
12

78
32
74
50
54
40
42
18
80
32
76
32
44
52
62
20

80
78
76
74
18
52
32
38
26
42
40
34
50
62

48
62
56
22
24
58
54
70
78
46
18
52
68
72
80
82
66
64
16

48
62
58
46
24
56
54
70
78
18
52
68
72
80
82
66
16

SHIFT BY WIRE TRANSMISSION SHIFT CONTROL SYSTEM

TECHNICAL FIELD

The present disclosure relates generally to a gear shift system for a vehicle transmission.

BACKGROUND OF THE DISCLOSURE

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift level movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. If electrical power is lost to the vehicle, or to the electrical circuit of the vehicle from which electricity is supplied to the shift-by-wire system, then the ability of the operator to control shifting of the transmission via the shift control unit is also lost.

SUMMARY OF THE DISCLOSURE

A gear shift control system permits a driver to control shifting among the gears of a vehicle transmission. The gear shift control system is a shift-by-wire system where shifting among and between the transmission gears may be accomplished with one or more electrical components and without a direct physical linkage between the driver and transmission. If electrical power is lost in the vehicle, the gear shift control system provides a mechanism to shift the vehicle transmission into park even if the driver is not able to directly command such a shift due to the lack of electrical power. In at least some implementations, the gear shift control system also enables normal, driver controlled shifting of the transmission when electrical power is restored.

At least one implementation of a gear shift control system includes an output mechanism coupled to a vehicle transmission, a first drive member coupled to the output mechanism to drive the output mechanism to shift between gears of the transmission and a drivetrain. The drivetrain interconnects the drive member and the output mechanism so that the output mechanism is driven by the drive member through the drivetrain. The drivetrain may include a first input driven by the drive member during a first mode of operation of the gear shift control system and an output coupled to both the first input and the output mechanism to drive the output mechanism as commanded by the drive member. During a second mode of operation of the gear shift control system a second input is coupled to the output. The drivetrain may also include a second drive member coupled to the second input to drive the output mechanism through the second input and the output during the second mode of operation to cause a transmission gear shift. In at least one implementation, the transmission is shifted into park during the second mode of operation, and this may occur even if electrical power is not available to the shift control system.

In at least some implementations, the gear shift control system may include a first drive member including an electric motor, an output shaft coupled to a vehicle transmission and to the first drive member to be driven for rotation by the first drive member, and a planetary gear set. The gear set is coupled to the first drive member and the output shaft, and has three intermeshed gear elements which may include a ring gear, a sun gear and at least one planet gear. A first of the gear elements is coupled to the first drive member and is driven for rotation by the first drive member, and a second of the gear elements is coupled to the output shaft for rotation with the output shaft. A second drive member is coupled to a third of the gear elements to drive the output shaft through the third gear element and the first gear element, wherein during a first mode of operation the transmission is shifted between park and other gears by causing the first drive member to rotate the output shaft through the second gear element and the first gear element when a transmission gear shift is desired, and during a second mode of operation, the transmission is shifted to park by the second drive member which drives the output shaft through the third gear element and first gear element.

A method of shifting a vehicle transmission between park and other transmission gears is also disclosed. The method may include providing a planetary gear set having a sun gear, a ring gear and one or more planet gears meshed with the sun and ring gears and carried by a carrier, and providing an output shaft coupled to the carrier for corotation with the carrier. One of the sun gear or the ring gear may be driven while holding against rotation the other one of the sun gear and ring gear during a first mode of operation wherein the output shaft is rotated to cause shift the transmission gear between park and drive gears. For the sake of discussion, the sun gear will be considered to be driven in the above example while the ring gear is held against rotation. Continuing with this example, the ring gear may also be driven while the sun gear is held so that it does not rotate to rotate the output shaft in a direction to shift the transmission to park during a second mode of operation.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figure 1:
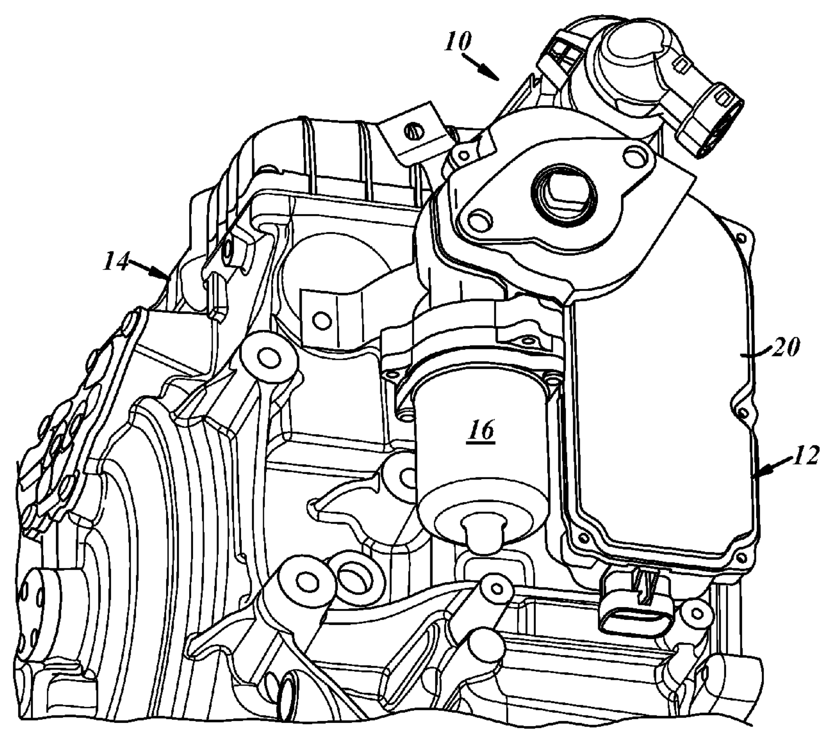
FIG. 1 is a partial perspective view of a transmission including a shifting system actuator.
Figure 3:
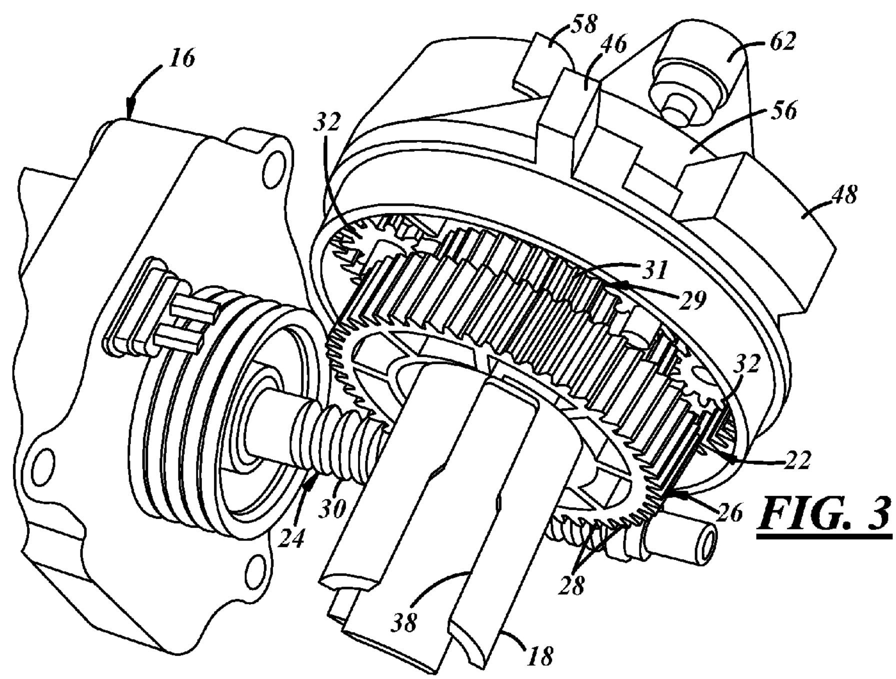
FIG. 3 is a perspective view of certain components of the actuator, illustrating a worm gear driven by a motor and engaged with a first input of a drivetrain of the actuator.

Referring in more detail to the drawings, FIG. 1 shows a transmission shifting system 10 including an actuator 12 that is controlled by an operator of a vehicle to command a gear shift of the transmission 14, for example to shift the transmission among and between park, neutral, reverse and forward drive gears. The shifting system 10 may be a so-called "shift by wire" system where an operator command for a gear shift is transmitted to an electric motor 16 of the actuator 12, and the motor 16 drives an output mechanism, such as an output shaft 18 (FIG. 3), of the actuator 12 that is coupled to a shift mechanism of the transmission 14 to shift among the transmission gears. The output mechanism may be any device or component that may couple, directly or indirectly, the actuator to a shift mechanism of the transmission. Should electric power be lost in the vehicle, or at least in an electrical circuit of the vehicle electric system that includes the motor 16, then the ability of the vehicle operator to control shifting of the vehicle transmission may also be lost. In this situation, it may be desirable to shift the transmission 14 into park so that any motion of the vehicle can be stopped and further motion prevented until the electric power is restored to the actuator motor 16.

Figure 2:
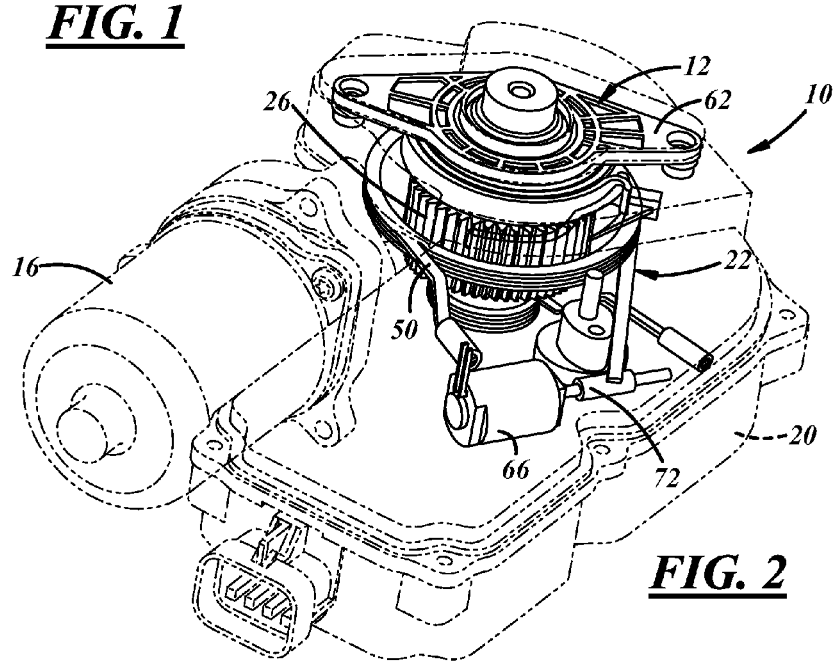
FIG. 2 is a perspective view of the actuator with a housing of the actuator shown transparent and in dashed lines to illustrate internal components of the actuator.

As shown in FIGS. 2-4 and 9-13, the actuator 12 may include a housing 20, which is shown in phantom in FIG. 2 to expose internal components. The actuator may also include a main drive element that, through a drivetrain 22, drives the output shaft 18 to shift the transmission 14. The main drive element may be any device capable of causing a shift of the transmission in response to an operator of the vehicle's request. The drivetrain may be any device or devices that interface with the main drive element and the transmission to facilitate shifting the transmission. In at least one implementation, the main drive element includes the electric motor 16 and a drive gear 24, shown here as a worm that is rotated by the motor. The worm 24 in this implementation is meshed with a first input 26 of the drivetrain 22, which, in this implementation, is shown as a worm gear having external teeth 28 that mesh with teeth 30 on the worm 24. Further, in the implementation shown, the drivetrain 22 includes a planetary gear set and the first input includes a sun gear 29 that is coupled to the worm gear 26. Accordingly, rotation of the worm 24 causes rotation of the worm gear 26 and sun gear 29.

As shown in FIGS. 3, 5, 6 and 7, the sun gear 29 includes teeth 31 adapted to be meshed with an output 32 of the drivetrain 22. In the implementation shown, the output 32 includes one or more planet gears meshed with the sun gear 29 so that rotation of the sun gear 29 causes rotation of the planet gears 32. The planet gears 32 are carried for rotation about shafts or pins 34 that are connected to a carrier 36. The carrier 36, in turn, is coupled to the output shaft 18 such as by one or more keys of the carrier 36 being received in complementary keyways 38 formed in the output shaft 18, for corotation of the carrier 36 and output shaft 18. In this way, movement of the planet gears 32 around the sun gear 29 causes rotation of the output shaft 18. In the implementation shown three planet gears 32 are provided, although any desired number may be used.

Figure 6:
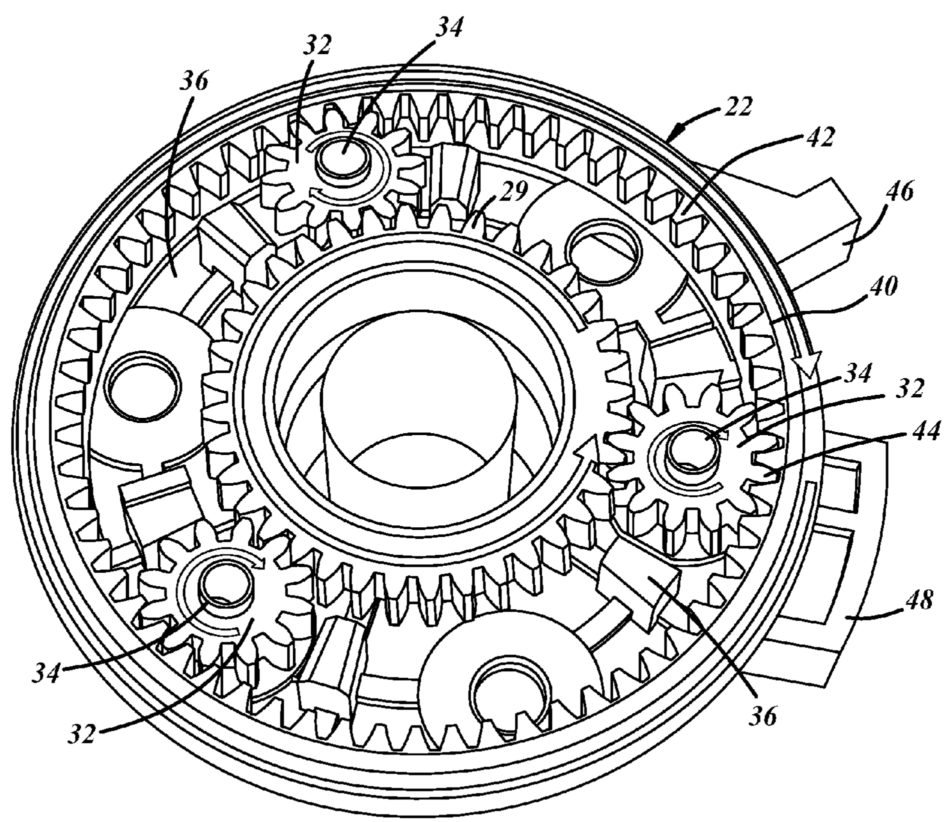
FIG. 6 is a perspective view showing gears in the drivetrain of the actuator.

As best shown in FIG. 6, the planet gears 32 are also meshed with a second input 40 of the drivetrain 22. The second input, in the implementation shown, includes a ring gear 40 having inwardly extending teeth 42 meshed with complementary teeth 44 of the planet gears 32. During a normal or first mode of operation of the actuator 12 in which the gears of the transmission 14 are shifted as commanded by an operator of the vehicle, the planet gears 32 move relative to the ring gear 40 about the inner circumference of the ring gear 40, and the ring gear is held so that it does not rotate. In at least one implementation, the ring gear 40 is held against rotating in one direction by engagement of a stop surface 46 carried by the ring gear with an adjacent structure, such as a tab or flange 48 of the carrier 36. And the ring gear 40 may be held against rotation in a second direction, that is opposite to the first direction, by a locking mechanism 50.

Figure 10:
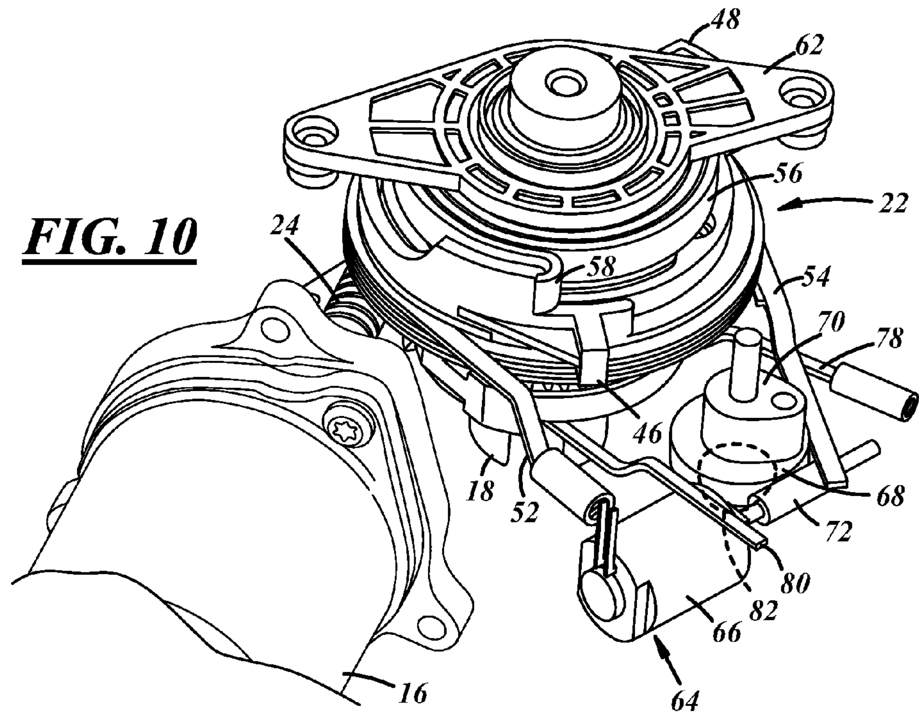
FIG. 10 is a front perspective view of the actuator in a second mode of operation wherein the vehicle transmission is returned to park.

The locking mechanism 50 may be any device capable of inhibiting or preventing rotation of the ring gear, and it may be releasable to selectively permit rotation of the ring gear 40 in the second direction during a second mode of operation. In at least one implementation, the actuator's second mode of operation causes the transmission 14 to be shifted to park when electric power to the motor 16 is lost. During this second mode of operation, the lock mechanism 50 is released so that the ring gear 40 can rotate, the sun gear 29 is held in place and the ring gear 40 is driven in the second direction. Rotation of the ring gear 40 causes a corresponding movement of the planet gears 32 and both the ring gear 40 and planet gears 32 rotate relative to the sun gear 29. This movement of the planet gears 32 causes rotation of the output shaft 18 and a corresponding movement of the shift mechanism 20 of the transmission 14 until the transmission is shifted into park. The sun gear 29 may be held in place by the motor 16 which, while not operating, resists or prevents rotation of the worm 24 to which the sun gear 29 is coupled via the worm gear 26. Of course, a separate lock mechanism may be used to hold the sun gear 29 during the second mode of operation, if desired. The position of the actuator after the second mode of operation is shown in FIG. 10.

In the implementation shown, for example in FIGS. 2 and 7-13, the locking mechanism 50 is a torsion spring that is coiled around the exterior of the ring gear 40 and has one fixed leg 52 and one movable leg 54. The fixed leg 52 is attached to or otherwise held immobile by an adjacent structure, which could be the housing 20 or other portion of the actuator 12 or a structure not related to the actuator. The movable leg 54 may be moved relative to the fixed leg 52. In its normal state, without movement of the movable leg 54 relative to the fixed leg 52, the spring 50 provides a force that prevents or at least inhibits or limits rotation of the ring gear 40 in the second direction. However, when the movable leg 54 is moved away from the fixed leg 52, the force of the spring 50 on the ring gear 40 is relieved or at least sufficiently reduced to permit rotation of the ring gear 40 in the second direction.

Figure 4:
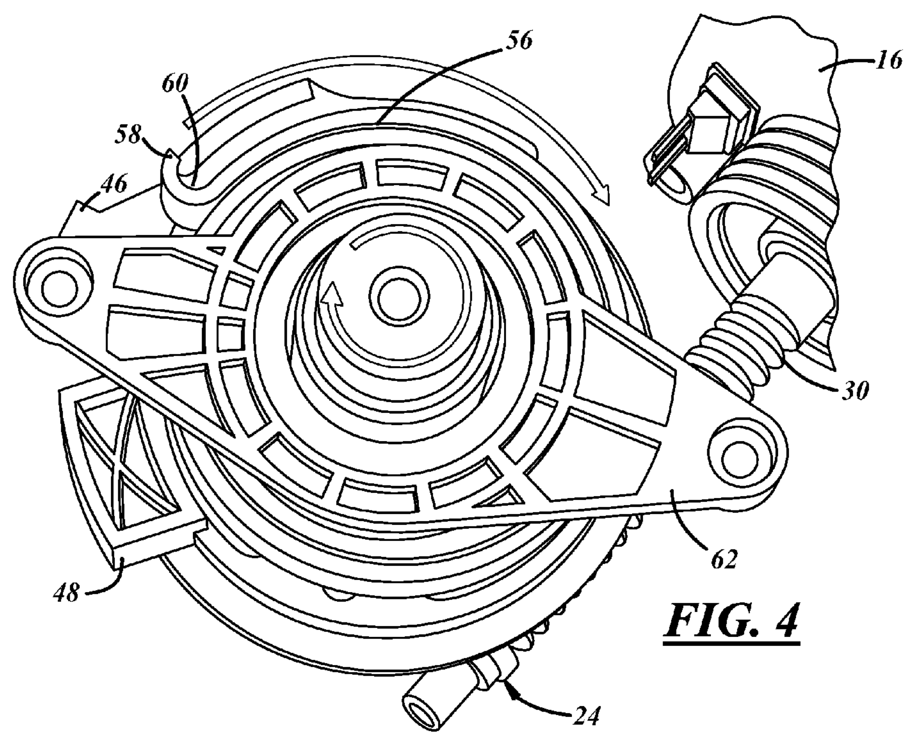
FIG. 4 is a rear perspective view of a portion of the actuator.
Figure 5:
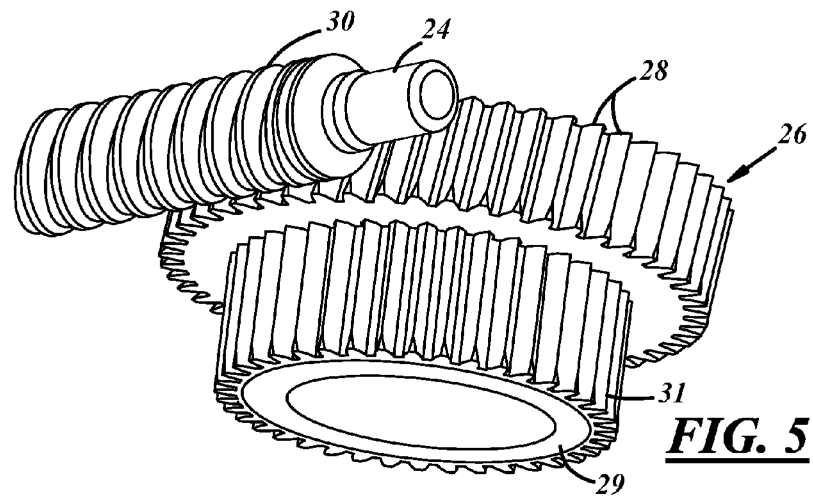
FIG. 5 is an enlarged, fragmentary perspective view of a portion of the worm gear and first input of FIG. 3.

Rotation of the ring gear 40 in the second direction is accomplished by a second drive element 56 which may be any device that can provide a suitable rotational force on the ring gear 40. In the implementation shown, the second drive element is a spring which is called herein a return spring 56 because its function is to return the transmission 14 to park. While any suitable spring could be used, the return spring 56 is shown as a torsion spring in the illustrated example. As shown in FIG. 4 (and other views), the return spring 56 has a first end 58 bearing on the ring gear 40, such as at a shoulder 60 of the ring gear 40 to bias the ring gear 40 for rotation in the second direction. A second end (not shown) of the return spring bears on a bracket 62, which may be attached to another structure and held against rotation. Accordingly, when the force of the locking mechanism 50 on the ring gear 40 is relieved, the return spring 56 rotates the ring gear 40 in the second direction which causes the output shaft 18 to rotate and return the transmission 14 to park.

As best shown in FIGS. 9-13, a release mechanism 64 is provided to release the ring gear locking mechanism 50 and permit rotation of the ring gear 40. As noted above, the illustrated embodiment of the locking mechanism is a torsion spring 50 that is released by moving the movable leg 54 in a direction tending to unwind the spring 50. To move the movable leg 54, a third drive element 66 is provided which engages and moves the leg 54 as noted. The third drive element 66, in at least one implementation, includes a small electric motor that rotates an actuator 68 to selectively engage and move the movable leg. As shown, the actuator 68 includes a cam lobe 70 that engages and displaces the movable leg 54 when the actuator 68 is rotated. While the motor 66 could directly drive the actuator 68, in the version shown, the motor 66 drives a worm 72 which in turn drives a worm gear of the actuator 68. The motor 66 may be driven by electrical power charged and stored, for example, in one or more capacitors or other charge storage device. Accordingly, even if electric power in the vehicle is not otherwise functioning, the stored charge can be used to drive the release mechanism motor 66.

Figure 11:
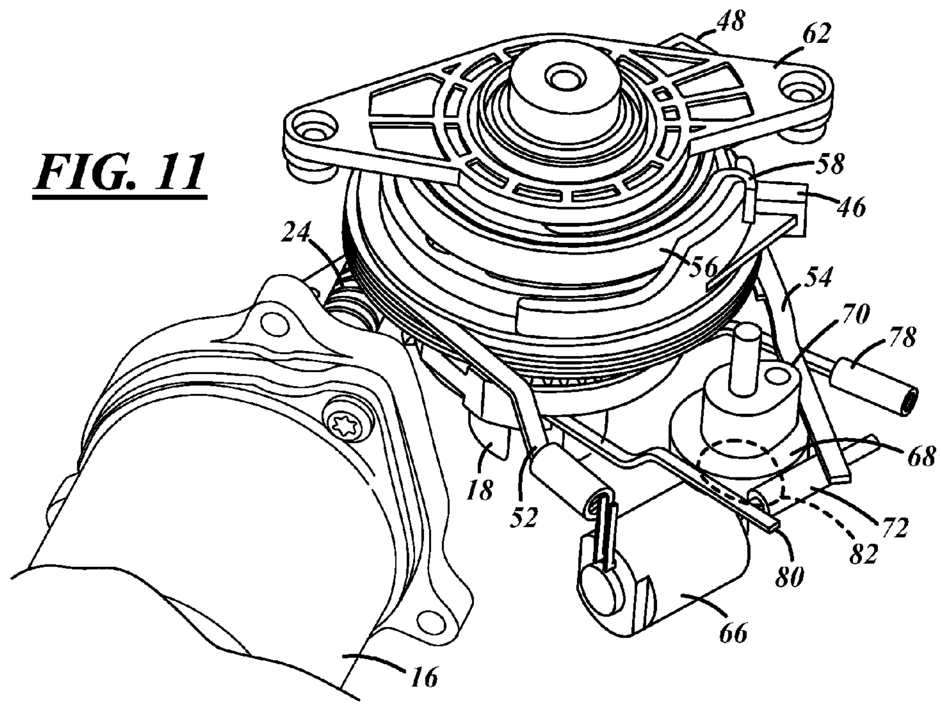
FIG. 11 is a rear perspective view of the actuator in a third mode of operation wherein the actuator is reset to its position for subsequent operation the first mode.
Figure 12:
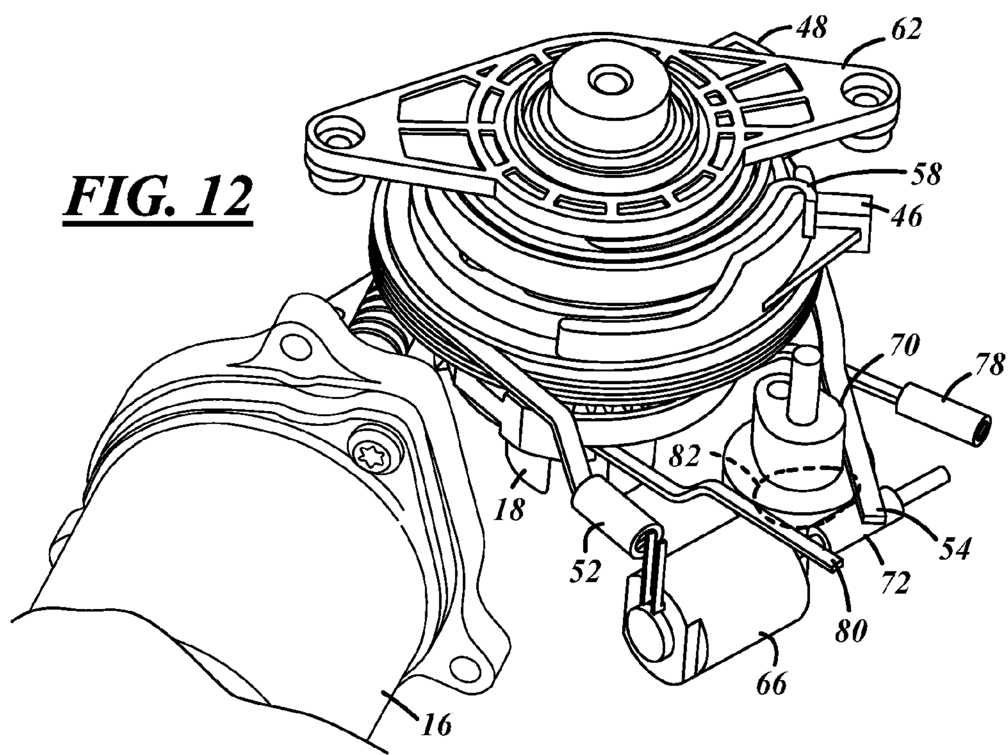
FIG. 12 is a rear perspective view of the actuator in the third mode of operation and almost reset to its position for subsequent operation in the first mode.

As shown in FIGS. 11 and 12, a third mode of operation may be employed after the second mode of operation is complete and the vehicle transmission 14 is returned to park. The third mode of operation resets the actuator 12 so that the normal or first mode of operation can again commence when electrical power is restored to the main motor. In more detail, during the recovery or third mode of operation, the ring gear 40 is rotated in the first direction to the position it was in prior to the return to park (that is, the second) mode of operation. This winds the return spring 56 so that the necessary force can again be provided for a subsequent return to park event, if electrical power to the main motor 16 is again lost.

To return the ring gear 40 to its starting position, the output shaft 18 is held immobile, the ring gear 40 is not locked and the main motor 16 is energized to rotate the sun gear 29. Rotation of the sun gear 29 causes a corresponding rotation of the planet gears 32 which in turn rotate the ring gear 40 back toward its starting position and thereby winds the return spring 56. This may be readily seen, for example, by comparing the position of the first end 58 of the spring 56 in FIG. 10 with its position in FIG. 11.

Figure 8:
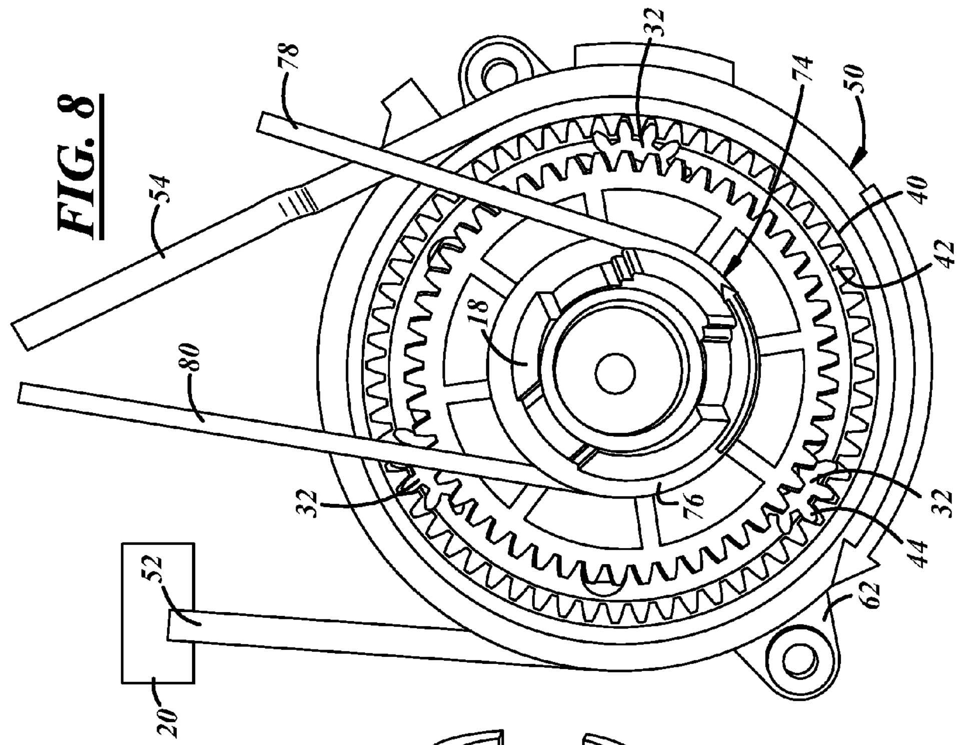
FIG. 8 is a front view of the portion of the drivetrain shown in FIG. 7.
Figure 7:
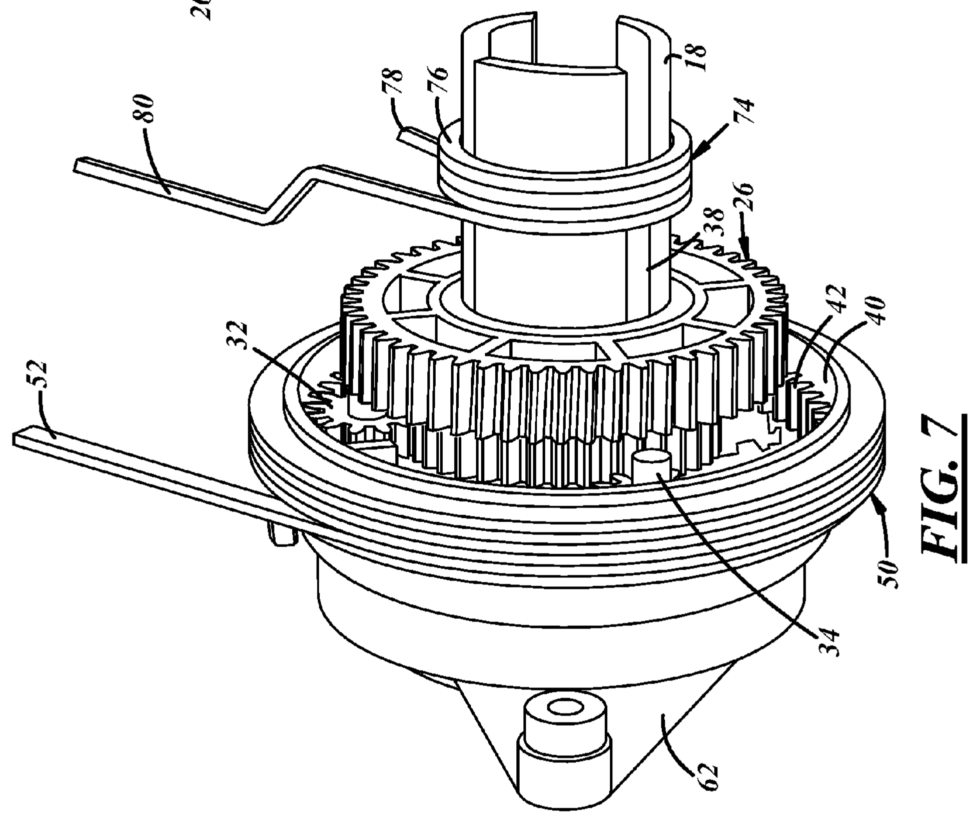
FIG. 7 is side perspective view showing a portion of the drivetrain of the actuator.
Figure 9:
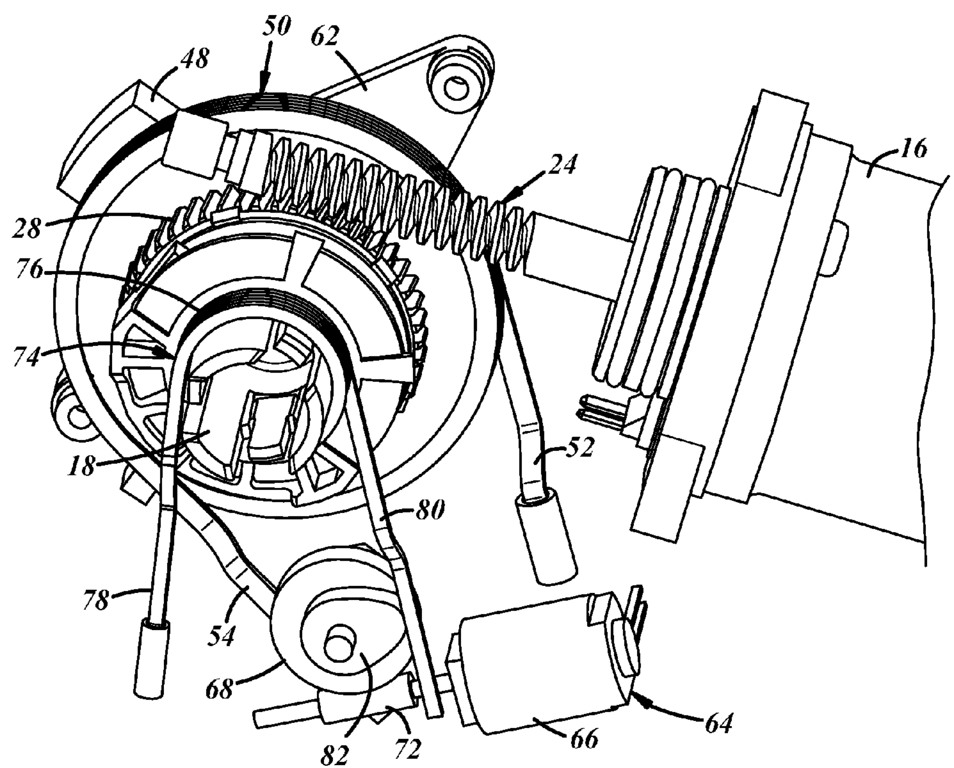
FIG. 9 is a perspective view of the actuator with its housing removed and shown in position for a first mode of operation permitting shifting of the vehicle transmission between its gears.

The output shaft 18 may be locked by any suitable mechanism during the third mode of operation. In the implementation shown, another torsion spring 74 is used to hold the output shaft 18 against rotation when desired, as shown in FIGS. 7-9. Like the ring gear torsion spring 50, the output shaft torsion spring 74 includes a body 76 coiled about the output shaft 18, a fixed leg 78 and a movable leg 80. In its at rest position, the spring 74 provides a force on the shaft 18 that inhibits or prevents the shaft 18 from rotating. When the movable leg 80 is moved in direction tending to unwind the spring 74, the force on the shaft 18 is reduced or relieved and the shaft 18 can rotate relative to the spring 74. To selectively move the movable leg 80, a release mechanism 64 may be used. The release mechanism 64, in the implementation shown, is the same mechanism 64 used to release the ring gear torsion spring 50.

As shown in FIG. 9, the actuator 68 includes a second cam lobe 82 arranged to selectively engage and displace the movable leg 80 during a portion of the rotation of the actuator 68. In this example, the second cam lobe 82 may engage and move the movable leg 80 to relieve the spring force on the output shaft 18 during at least the first mode of operation, as shown, for example, in FIG. 9. This permits the output shaft 18 to rotate relative to the spring 74 so that shifting of the transmission 14 can be accomplished under operator command. The second cam lobe 82 may be moved for the third mode of operation so that the movable leg 80 moves in a direction tending to further wind the spring 74 onto the output shaft 18 and the spring force is applied to the shaft 18 to inhibit or prevent the shaft from rotating in one direction.

Figure 13:
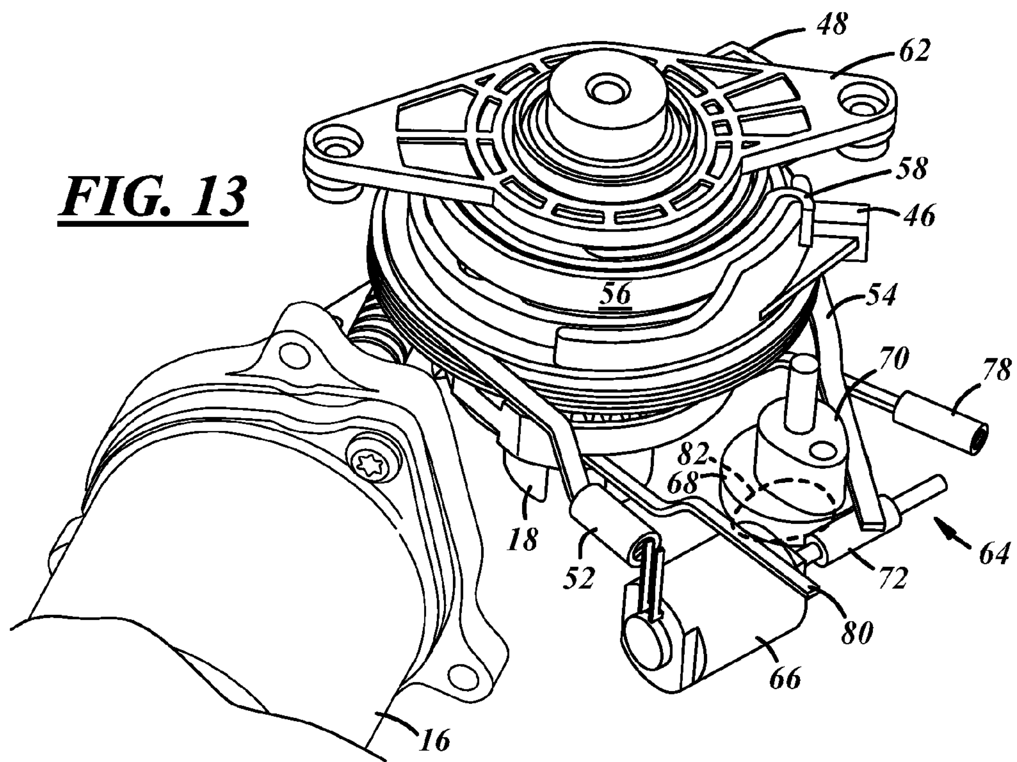
FIG. 13 is a rear perspective view of the actuator in position for its first mode of operation and corresponding to when the vehicle transmission is in park.

The cam lobe 82, which cannot be directly seen in the views of FIGS. 10-13, is shown in dashed lines in FIGS. 10-13 to illustrate the movement and certain positions of the cam lobe 82 as the actuator 68 rotates. For example, in FIG. 12, the nose of the cam lobe 82 is shown not engaged with the movable leg 80, and in that position the spring 74 prevents rotation of the output shaft 18. In FIG. 13, the nose of the cam lobe 82 is engaged with and displacing the movable leg 80 so that the spring 74 does not prevent rotation of the output shaft 18.

With the output shaft 18 held in position, the carrier 36 does not rotate during the third mode of operation. Instead, the planet gears 32 only rotate around their shafts 34. When the main motor 16 is energized to drive the sun gear 29, the rotation of the sun gear 29 is transmitted to the ring gear 40 via the rotating planet gears 32. This returns the ring gear 40 to its starting position (e.g. the position it was in before the second mode of operation), which also winds the return spring 56 as noted above.

After the ring gear 40 is returned to its starting position, the release mechanism 64 can move the first cam 70 out of engagement with the movable leg 54 of the ring gear locking mechanism 50, as is shown in FIG. 12, to re-lock the ring gear 40 and prevent it from rotating. Continued rotation of the release mechanism 64 may also move the second cam 82 into engagement with the movable leg 80 of the output shaft locking mechanism 74, as shown in FIG. 13, to displace the movable leg 80 and thereby unlock and permit rotation of the output shaft 18. In this way, the actuator components (e.g. motors, drivetrain, output shaft, release mechanism and locking mechanisms) are positioned and arranged to permit future shifting of the transmission 14 in the first mode of operation, as commanded by a vehicle operator under the power of the main motor 16.

While the forms of the invention herein disclosed constitute presently preferred embodiments, many others are possible. It is not intended herein to mention all the possible equivalent forms or ramifications of the invention. For example, while the drivetrain 22 was shown and described as a planetary gear set, other arrangements are possible. Also, while the first input was described as being the sun gear 29, the second input the ring gear 40 and the output the planet gears 32, the gears could be arranged differently so that the different gears define different ones of the inputs and output. It is understood that the terms used herein are merely descriptive, rather than limiting, and that various changes may be made without departing from the spirit or scope of the invention.

The invention claimed is:

1. A gear shift control system, comprising:

an output mechanism coupled to a vehicle transmission;

a first drive member coupled to the output mechanism to drive the output mechanism to shift between gears of the transmission;

a drivetrain that interconnects the drive member and the output mechanism so that the output mechanism is driven by the drive member through the drivetrain, the drivetrain includes a first input driven by the drive member during a first mode of operation of the gear shift control system and an output coupled to both the first input and the output mechanism to drive the output mechanism as commanded by the drive member, and during a second mode of operation of the gear shift control system a second input is coupled to the output;

a second drive member coupled to the second input to drive the output mechanism through the second input and the output during said second mode of operation to cause a transmission gear shift; and a lock associated with the second input, wherein the lock includes a torsion spring that selectively prevents movement of the second input and has a first end and a second end held in place during the first mode of operation to prevent movement of the second input, and wherein during the second mode of operation the second end of the spring is moved to relieve the locking force on the second input and permit movement of the second input.

2. The system of claim 1 wherein the first drive member is electrically operated and the second drive member does not drive the second input unless electric power to the first drive member is lost.

3. The system of claim 1 wherein the first input, second input and the output are intermeshed gears and during the first mode of operation the second input is held in position and does not move, and during said second mode of operation the first input is held in position and does not move.

4. The system of claim 1 wherein the first input, second input and the output are gears in a planetary gear set with the output being one or more planet gears, the first input being one of a sun gear and a ring gear and the second input being the other of the sun gear and ring gear.

5. The system of claim 1 which also comprises a release mechanism associated with the lock to release the lock before the second mode of operation and permit movement of the second input during the second mode of operation.

6. The system of claim 1 wherein the first mode of operation includes shifting the transmission between park and drive gears with the first drive member during normal operation of the vehicle, and the second mode of operation includes returning the vehicle transmission to park with the second drive member during an electric power loss event in the vehicle.

7. The system of claim 1 wherein the second drive member includes a spring providing a spring force on the second input tending to drive the second input in a direction that would shift the vehicle transmission to its park gear, and wherein the lock is provided on the second input to prevent movement of the second input by the spring during the first mode of operation.

8. The system of claim 7 wherein the second input is a gear and the torsion spring is wound around the gear with a first end held in place and a second end held in place during the first mode of operation to prevent rotation of the second input and provide said lock, and wherein during the second mode of operation the second end of the spring is moved to relieve the locking force on the second input and permit rotation of the second input.

9. The system of claim 8 which also comprises a release mechanism that moves the second end of the spring before the second mode of operation.

10. A gear shift control system, comprising:

an output mechanism coupled to a vehicle transmission;

a first drive member coupled to the output mechanism to drive the output mechanism to shift between gears of the transmission;

a drivetrain that interconnects the drive member and the output mechanism so that the output mechanism is driven by the drive member through the drivetrain, the drivetrain includes a first input driven by the drive member during a first mode of operation of the gear shift control system and an output coupled to both the first input and the output mechanism to drive the output mechanism as commanded by the drive member, and during a second mode of operation of the gear shift control system a second input is coupled to the output;

a second drive member coupled to the second input to drive the output mechanism through the second input and the output during said second mode of operation to cause a transmission gear shift; and a lock associated with the output mechanism to prevent movement of the output mechanism during a third mode of operation that occurs after the second mode of operation wherein the drive member drives the first input to drive the second input in a direction opposite to the direction of movement of the second input during the second mode of operation to return the second input toward the position it was in before the second mode of operation.

11. The system of claim 10 wherein the second drive member includes a spring that provides a force on the second input tending to rotate the second input in a first direction when the second input is in its position during the first mode of operation, and driving the second input in a second direction during the third mode of operation resets the spring to reset the force of the second drive member to enable use of the second drive member during a subsequent second mode of operation.

12. A gear shift control system, comprising:

a first drive member including an electric motor;

an output shaft coupled to a vehicle transmission and to the first drive member to be driven for rotation by the first drive member;

a planetary gear set coupled to the first drive member and the output shaft, and having three intermeshed gear elements including a ring gear, a sun gear and at least one planet gear, where a first gear element is coupled to the first drive member and is driven for rotation by the first drive member, and a second gear element is coupled to the output shaft for rotation with the output shaft;

a second drive member coupled to a third gear element to drive the output shaft through the third gear element and the first gear element, wherein during a first mode of operation the transmission is shifted between park and other gears by causing the first drive member to rotate the output shaft through the second gear element and the first gear element when a transmission gear shift is desired, and during a second mode of operation, the transmission is shifted to park by the second drive member which drives the output shaft through the third gear element and first gear element; and a lock associated with the output shaft to prevent movement of the output shaft during a third mode of operation that occurs after the second mode of operation, and in the third mode of operation the first drive member rotates the first gear element to drive the third gear element in a direction opposite to the direction of movement of the third gear element during the second mode of operation to return the third gear element toward the position it was in before the second mode of operation.

13. A method of shifting a vehicle transmission between park and other transmission gears, comprising:

driving a first input while holding against rotation a second input to shift the transmission gear between park and drive gears in a first mode of operation;

storing electrical power in a charge storage device;

releasing the second input when a vehicle power loss occurs by providing electrical power from the charge storage device to a release mechanism; and driving the second input to rotate an output mechanism in a direction to shift the transmission to park during a second mode of operation.

14. The system of claim 5 wherein the release mechanism is electrically powered and is powered by a charge storage device capable of providing power to the release mechanism when power to the first drive member is lost.

15. The system of claim 14 wherein the charge storage device includes a capacitor that stores a charge that may be provided to the release mechanism.

16. A gear shift control system, comprising:

an output coupled to a vehicle transmission;

a first drive member coupled to the output to drive the output to shift between gears of the transmission;

a second drive member selectively coupled to the output to drive the output to shift between gears of the transmission;

a drivetrain that interconnects the first drive member and the second drive member to the output, the drivetrain is driven by the first drive member to cause a transmission gear shift during a first mode of operation of the gear shift control system and the drivetrain is driven by the second drive member to cause a transmission gear shift during a second mode of operation of the gear shift control system;

a lock that prevents the second drive member from driving the drivetrain during said first mode of operation;

a release coupled to the lock to selectively release the lock and allow the second drive member to drive the drivetrain;

an actuator coupled to the release to selectively actuate the release to thereby release the lock; and a power storage device coupled to the release and which stores a reserve of electrical power that is used to actuate the release.

17. The system of claim 16 wherein the actuator includes an electrically powered motor that is powered by the power storage device when it is desired to release the lock.

18. The system of claim 16 wherein the power storage device includes a capacitor.

19. The system of claim 16 wherein the lock includes a torsion spring that engages and prevents movement of a portion of the drivetrain during the first mode of operation.

20. The system of claim 16 wherein the drivetrain includes a planetary gear set and the first drive member drives one of a sun gear and a ring gear during the first mode of operation and the second drive member drives the other of the sun gear and ring gear during the second mode of operation.

* * * * *